(12) United States Patent
Jeon

(10) Patent No.: US 10,968,997 B2
(45) Date of Patent: Apr. 6, 2021

(54) ANTI-BACKLASH STRUCTURE FOR SCISSORS GEAR

(71) Applicants: HYUNDAI MOTOR COMPANY, Seoul (KR); KIA MOTORS CORPORATION, Seoul (KR)

(72) Inventor: Jae-Hee Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 107 days.

(21) Appl. No.: 16/397,095

(22) Filed: Apr. 29, 2019

(65) Prior Publication Data
US 2020/0200252 A1  Jun. 25, 2020

(30) Foreign Application Priority Data
Dec. 20, 2018 (KR) .................. 10-2018-0166449

(51) Int. Cl.
  *F16H 55/18* (2006.01)
  *F16H 57/00* (2012.01)
  *F16H 57/12* (2006.01)

(52) U.S. Cl.
  CPC ......... *F16H 55/18* (2013.01); *F16H 57/0006* (2013.01); *F16H 57/0025* (2013.01);
  (Continued)

(58) Field of Classification Search
  CPC ............. F16H 57/0006; F16H 57/0025; F16H 57/0031; F16H 2057/127; F16H 55/18; F16H 57/12
  See application file for complete search history.

(56) References Cited

U.S. PATENT DOCUMENTS 3,359,819 A * 12/1967 Veillette .................. F16H 55/18
                                                          74/409
5,174,253 A * 12/1992 Yamazaki ........... F01L 1/34406
                                                        123/90.17
(Continued)

FOREIGN PATENT DOCUMENTS

FR          2130894 A5 * 11/1972  ............. F16H 55/18
JP      2000274336 A  * 10/2000  .......... F02N 11/0855
(Continued)

*Primary Examiner* — Jake Cook
*Assistant Examiner* — Gregory Robert Weber
(74) *Attorney, Agent, or Firm* — McDonnell Boehnen Hulbert & Berghoff LLP

(57) ABSTRACT

An anti-backlash structure for a scissors gear is provided including a scissors gear and a cam gear which are coaxially connected to rotate relative to each other, an end piece which has one side which is press-fitted into a cam shaft so that the end piece rotates together with the cam shaft, the other side which is in surface-to-surface contact with the scissors gear, and a circumferential surface with which the cam gear is press-fitted; a bolt which is coupled to an inner diameter portion of the scissors gear, penetrates the end piece, and is inserted into the cam shaft; and a scissors spring which has one side coupled to the end piece, and the other side coupled to the bolt. When the end piece rotates, the scissors spring rotates the scissors gear relative to the cam gear through the bolt and allows the scissors gear to come into close contact with the cam gear.

7 Claims, 3 Drawing Sheets

(52) U.S. Cl.
CPC ......... *F16H 57/0031* (2013.01); *F16H 57/12* (2013.01); *F16H 2057/127* (2013.01)

(56) References Cited

U.S. PATENT DOCUMENTS

| | | | |
|---|---|---|---|
| 6,615,683 B1* | 9/2003 | Voigt | F16H 55/18 74/395 |
| 8,245,591 B2* | 8/2012 | Chen | F16H 55/18 74/409 |
| 9,010,209 B2* | 4/2015 | Murphy | F16H 55/18 74/409 |
| 9,927,018 B2* | 3/2018 | Dumanski | F16H 55/18 |
| 10,695,964 B2* | 6/2020 | Spuller | B29C 45/2735 |
| 2018/0195602 A1* | 7/2018 | Segawa | F16H 55/24 |

FOREIGN PATENT DOCUMENTS

| | | | | |
|---|---|---|---|---|
| KR | 10-1305618 B1 | | 9/2013 | |
| WO | WO-2010069645 A1 * | | 6/2010 | ......... F02N 11/0855 |

\* cited by examiner

ANTI-BACKLASH STRUCTURE FOR SCISSORS GEAR

CROSS REFERENCE TO RELATED APPLICATIONS

This application claims priority under 35 U.S.C. § 119 to Korean Patent Application No. 10-2018-0166449, filed on Dec. 20, 2018, in the Korean Intellectual Property Office, the disclosure of which is incorporated herein by reference in its entirety.

BACKGROUND

1. Field of Disclosure

The present disclosure relates to an anti-backlash structure for a scissors gear which reduces a backlash, (i.e., a gap between gears), and reduces rattling noise caused by the backlash. More particularly, the present disclosure relates to an anti-backlash structure for a scissors gear, in which a scissors spring connected to a bolt and an end piece enables the scissors gear and a cam gear to rotate relative to each other and simultaneously removes an axial load of a cam shaft.

2. Description of the Related Art

In general, valves, which open or close, at an appropriate timing, in combustion chambers of an engine that generates power, are opened or closed by a valve opening/closing mechanism connected to a crank shaft. Depending on methods of operating the valves, the engine is classified into a single-over-head-camshaft (hereinafter, abbreviated to SOHC) engine in which all of the valves are operated by a single cam shaft, and a double-over-head-camshaft (hereinafter, abbreviated to DOHC) engine in which intake and exhaust valves are operated by two cam shafts, respectively.

Because the two intake valves and the two exhaust valves are operated for each cylinder in the DOHC engine, a structure thereof is complicated, severe noise occurs, and power consumption required to operate the valves is higher in comparison with the SOHC engine. However, in the DOHC engine, the two intake valves and the two exhaust valves are installed for each cylinder and simultaneously operated by an intake cam shaft and an exhaust cam shaft, respectively, and as a result, it is possible to improve intake and exhaust performances in the combustion chamber.

In the DOHC engine, one of the intake and exhaust cam shafts directly transmits power, while the other of the intake and exhaust cam shafts receives the power from the one of the intake and exhaust cam shafts. To this end, gears are used for a system for driving cams. However, due to the nature of the gears that mesh with each other, the system for driving the cams has a limitation in improving engagement between the gears and reducing rattling noise which is inevitably caused by a backlash which is a gap between a driving gear and a driven gear.

Therefore, to reduce the backlash occurring between the gears, the system for driving the cams uses a cam gear and a scissors gear which are backlash compensation gears using scissors spring force.

In this regard, Korean Patent No. 10-1305618 in the related art (Cam Shaft Unit for Vehicle) discloses a cam shaft unit including: a cam gear and a scissors gear which rotate relative to each other with a scissors spring interposed therebetween; a cup spring which prevents the scissors gear from being withdrawn by the relative axial motion between the cam gear and the scissors gear; a snap ring which fixes the cup spring to the scissors gear; and the scissors spring which rotates the scissors gear and the cam gear, in which the scissors gear is brought into close contact with the cam gear by the cup spring such that no backlash occurs and rattling noise is reduced.

However, the related art has a problem in that because the scissors gear and the cam gear are connected by the spring, stable dynamic characteristics cannot be obtained, and for this reason, there is a limitation in reducing operational noise of the gear.

In the related art, the cup spring for preventing the withdrawal of the scissors gear and the cam gear, the snap ring for fixing the scissors gear and the cam gear, and the scissors spring for rotating the scissors gear and the cam gear are configured as separate components, and as a result, there is a problem in that the number of components and costs are increased.

SUMMARY

The present disclosure has been made in an effort to provide an anti-backlash structure for a scissors gear, in which in an anti-backlash structure for a scissors gear in the related art, a scissors spring connected to a bolt and an end piece is configured to prevent withdrawal of the scissors gear and a cam gear, enable the scissors gear and the cam gear to rotate relative to each other, and remove an axial load of the cam shaft, thereby simplifying components.

An exemplary embodiment of the present disclosure provides an anti-backlash structure for a scissors gear, the anti-backlash structure including: a scissors gear and a cam gear which are coaxially connected to rotate relative to each other; an end piece which has one side which is press-fitted into a cam shaft so that the end piece rotates together with the cam shaft, the other side which is in surface-to-surface contact with the scissors gear, and a circumferential surface with which the cam gear is press-fitted; a bolt which is coupled to an inner diameter portion of the scissors gear, penetrates the end piece, and is inserted into the cam shaft; and a scissors spring which has one side coupled to the end piece, and the other side coupled to the bolt, in which when the end piece rotates, the scissors spring rotates the scissors gear relative to the cam gear through the bolt and allows the scissors gear to come into close contact with the cam gear.

The end piece may further include a press-fit groove which is formed in a circumferential surface of the end piece so that the cam gear is in close contact with the scissors gear and press-fitted with the end piece.

The bolt may further include: a bolt cap which is press-fitted with an inner diameter portion of the scissors gear; and a rod portion which is coupled to the bolt cap.

An internal thread and an external thread may be formed on an outer diameter portion of the rod portion and an inner diameter portion of the bolt cap, respectively.

An inner diameter of the end piece may be greater than an outer diameter of the bolt, such that the bolt rotates inside the end piece.

The end piece may further include an insertion groove which is formed at a lateral side of the scissors spring so as to accommodate the scissors spring.

The scissors spring may further include a straight portion which is inserted into the insertion groove such that the scissors spring and the end piece are coupled to each other.

The scissors spring may further include a through portion through which the bolt vertically penetrates such that the scissors spring and the bolt are coupled to each other.

According to the present disclosure configured as described above, there is an advantage in that the scissors gear and the cam gear are in close contact with each other by the end piece press-fitted into the shaft, and as a result, it is possible to obtain stable dynamic characteristics and reduce rattling noise in comparison with the related art in which a scissors gear and a cam gear are connected by a spring.

According to the present disclosure, there is an advantage in that the scissors spring connected to the end piece and the bolt is substituted for a cup spring and a snap ring in the related art, and as a result, it is possible to reduce the number of components and costs.

DETAILED DESCRIPTION OF THE EMBODIMENTS

Figure 1:
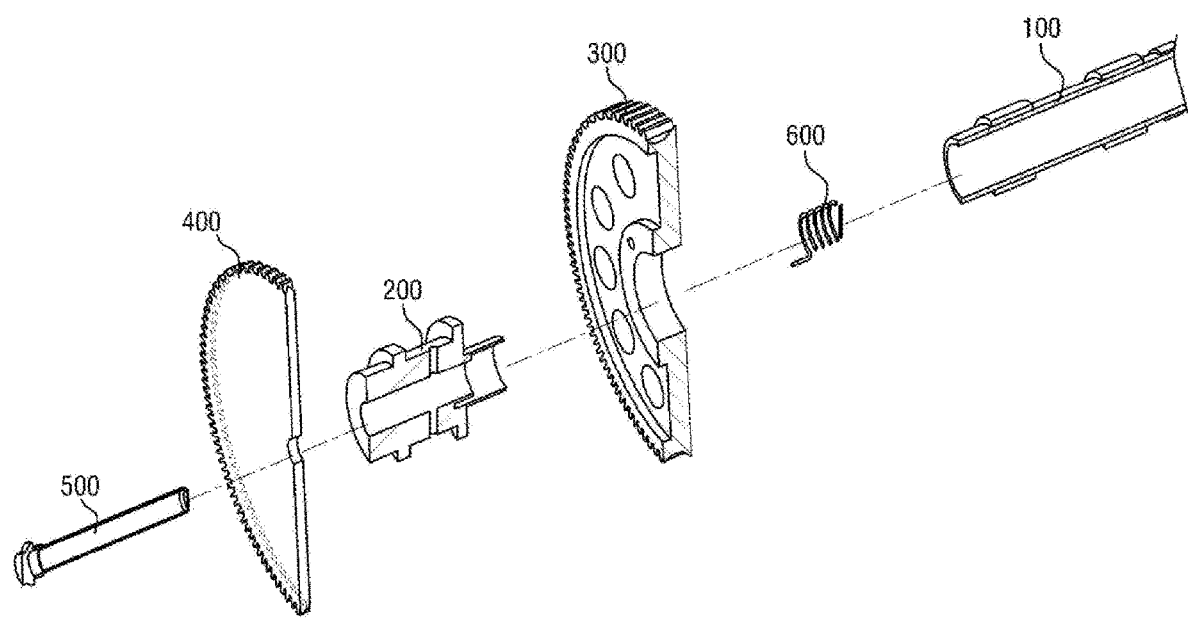
FIG. 1 is an exploded perspective view of an anti-backlash structure for a scissors gear according to an embodiment of the present disclosure.

Hereinafter, the present disclosure will be described in detail with reference to the accompanying drawings. However, the present disclosure is not restricted or limited by exemplary embodiments. Like reference numerals indicated in the respective drawings refer to members which perform substantially the same functions.

An object and an effect of the present disclosure may be naturally understood or may become clearer from the following description, and the object and the effect of the present disclosure are not restricted only by the following description. In addition, in the description of the present disclosure, the specific descriptions of publicly known technologies related with the present disclosure will be omitted when it is determined that the specific descriptions may unnecessarily obscure the subject matter of the present disclosure.

FIG. 1 is an exploded perspective view of an anti-backlash structure for a scissors gear 400 according to the present disclosure.

Referring to FIG. 1, the anti-backlash structure for the scissors gear 400 according to the present disclosure may include a cam shaft 100, a scissors gear 400, a cam gear 300, an end piece 200, a bolt 500, and a scissors spring 600.

The cam shaft 100 is rotatably provided to transmit power. The scissors gear 400 and the cam gear 300 may be coaxially connected to the cam shaft 100 and formed such that one surface of the scissors gear 400 and one surface of the cam gear 300 are to be in contact with each other.

Figure 2:
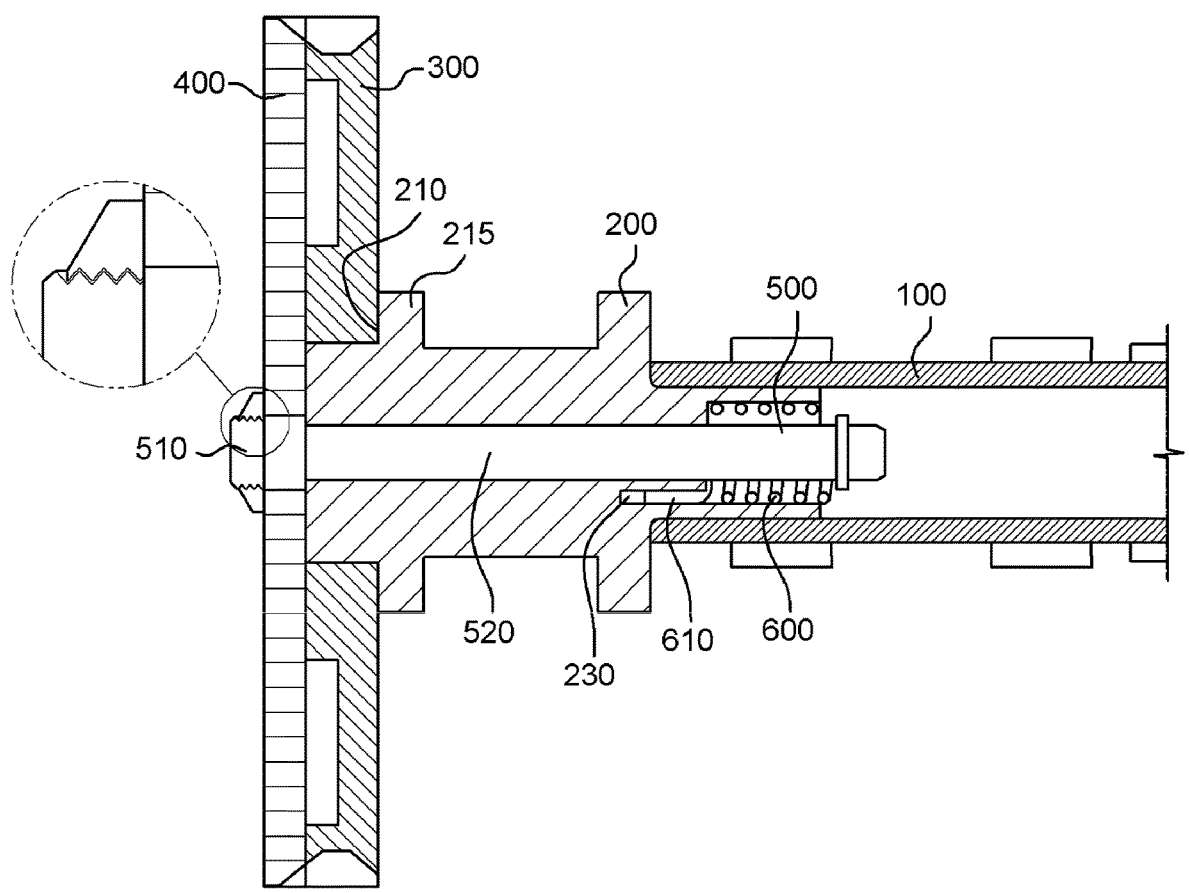
FIG. 2 is a cross-sectional view of the anti-backlash structure for the scissors gear according to an embodiment of the present disclosure.

FIG. 2 is a cross-sectional view of the anti-backlash structure for the scissors gear 400 according to the present disclosure.

Referring to FIG. 2, one side of the end piece 200 may be press-fitted into the cam shaft 100 such that the end piece 200 rotates together with the cam shaft 100, and the other side of the end piece 200 may be in surface-to-surface contact with the scissors gear 400.

The cam gear 300 may be press-fitted with a circumferential surface of the end piece 200, such that the end piece 200, which is rotated along with the rotation of the cam shaft 100, rotates the cam gear 300.

The end piece 200 may further include a press-fit groove 210 which is formed in the circumferential surface of the end piece 200 so as to have a width equal to a width of the cam gear 300 such that the cam gear 300 is in contact with the scissors gear 400 and press-fitted with the end piece 200.

A press-fit protrusion 215 formed at a rear side of the press-fit groove 210 may prevent the cam gear 300 from being withdrawn when the end piece 200 and the scissors gear 400 are rotated.

The bolt 500 may be coupled to an inner diameter portion of the scissors gear 400, penetrate the end piece 200, and be inserted into the cam shaft 100.

The bolt 500 may further include a bolt cap 510 which is press-fitted into the inner diameter portion of the scissors gear 400, and a rod portion 520 which is coupled to the bolt cap 510, such that the bolt 500 is coupled to the scissors gear 400.

An internal thread or an external thread is formed on an outer diameter portion of the rod portion 520, and a screw thread, which corresponds to the internal thread or the external thread, is formed on an inner diameter portion of the bolt cap 510, such that the rod portion 520 and the bolt 500 may be coupled to each other.

One side of the scissors spring 600 is coupled to the end piece 200, and the other side of the scissors spring 600 is coupled to the bolt 500, thereby allowing the scissors gear 400 to rotate relative to the cam gear 300 through the bolt 500, when the end piece 200 is rotated, and allowing the scissors gear 400 to come into close contact with the cam gear 300.

The end piece 200 has an insertion groove 230 formed at a lateral side of the scissors spring 600 so as to accommodate the scissors spring 600, and the scissors spring 600 has a straight portion 610 which is inserted into the insertion groove 230 such that the scissors spring 600 and the end piece 200 are coupled to each other. As a result, the end piece 200 and the scissors spring 600 may be coupled to each other.

The scissors spring 600 has a through portion through which the bolt 500 vertically penetrates, such that the scissors spring 600 and the bolt 500 are coupled to each other. As a result, the scissors spring 600 may be coupled to the bolt 500.

A mechanism of the anti-backlash structure for the scissors gear 400 will be described in detail with reference to FIG. 3.

Figure 3:
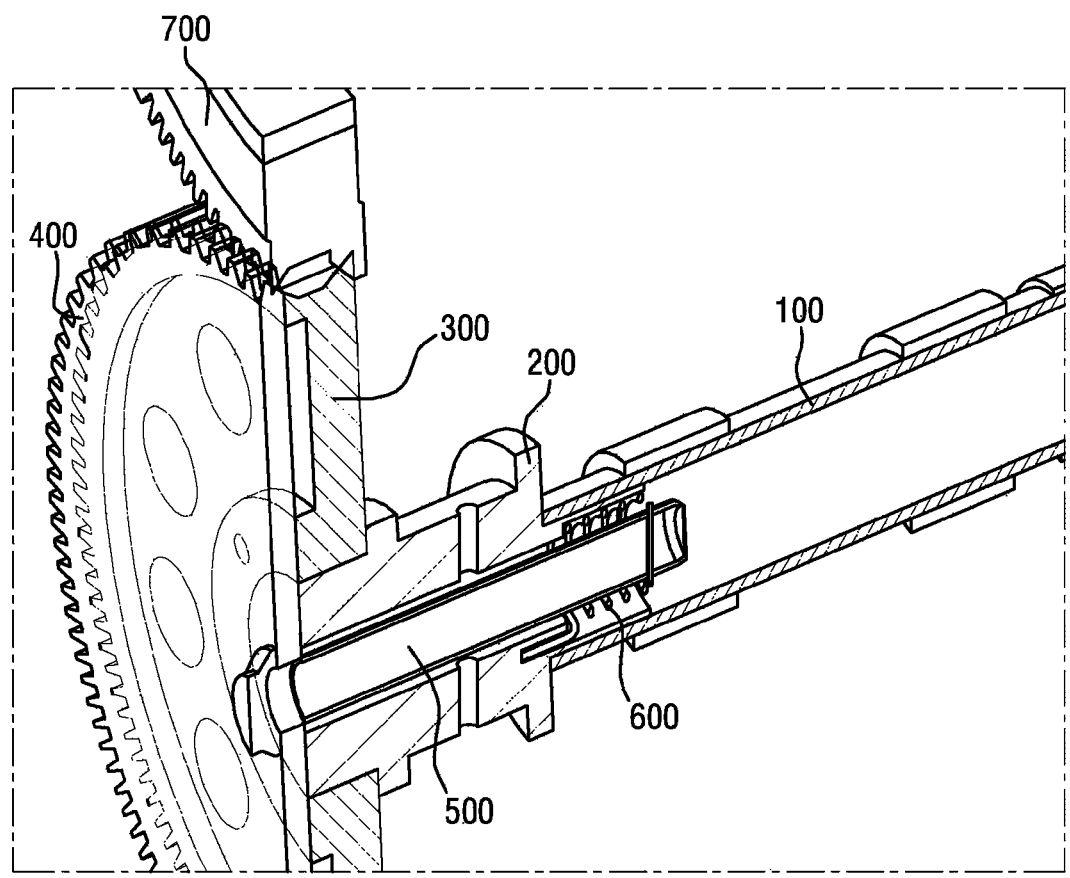
FIG. 3 is a perspective view of the anti-backlash structure for the scissors gear according to an embodiment of the present disclosure.

FIG. 3 is a perspective view of the anti-backlash structure for the scissors gear 400 according to the present disclosure.

Referring to FIG. 3, the end piece 200 press-fitted into the cam shaft 100 is rotated along with the rotation of the cam shaft 100.

The cam gear 300 inserted into the press-fit groove 210 is also rotated as the end piece 200 is rotated, and the scissors spring 600 coupled to the end piece 200 receives rotational force of the end piece 200.

In this case, the bolt 500 connected to one end of the scissors spring 600 is rotated by elastic force of the scissors spring 600, and the scissors gear 400 having the inner diameter portion coupled to the bolt 500 is rotated relative to the cam gear 300.

An inner diameter of the end piece 200 is greater than an outer diameter of the bolt 500, such that the bolt 500 may rotate inside the end piece 200 in a direction opposite to a direction in which the end piece 200 rotates.

The elastic force of the scissors spring 600 rotates the bolt 500 and simultaneously pulls the scissors gear 400 coupled to the bolt 500 toward the cam gear 300, such that the scissors gear 400 and the cam gear 300 may come into close contact with each other.

The elastic force of the scissors spring 600 may have an effect of damping an axial load of the cam shaft 100.

According to the anti-backlash structure for the scissors gear 400 of the present disclosure, the scissors gear 400 and the cam gear 300 are in surface-to-surface contact with each other by the press-fit groove 210 and the press-fit protrusion 215 formed in/on the end piece 200. The scissors gear 400 is pulled toward the cam gear 300 by the elastic force of the scissors spring 600 such that the contact between the scissors gear 400 and the cam gear 300 is securely maintained, and as a result, it is possible to obtain stable dynamic characteristics and reduce rattling noise.

The bolt 500, which rotates separately from the end piece 200, may be inserted into the cam shaft 100 to prevent the withdrawal of the scissors gear 400 and the cam gear 300. The bolt 500 may serve to transmit the elastic force of the scissors spring 600 to the scissors gear 400. As a result, it is possible to integrate a cup spring in the related art for preventing the withdrawal of the scissors gear 400 and the cam gear 300, a snap ring for fixing the scissors gear 400 and the cam gear 300, and a scissors spring in the related art for rotating the scissors gear 400 and a cam gear into the scissors spring 600.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. An anti-backlash structure for a scissors gear, the anti-backlash structure comprising:
   a scissors gear and a cam gear which are coaxially connected to rotate relative to each other;
   an end piece which has one side which is press-fitted into a cam shaft so that the end piece rotates together with the cam shaft, the other side which is in surface-to-surface contact with the scissors gear, and a circumferential surface with which the cam gear is press-fitted;
   a bolt which is coupled to an inner diameter portion of the scissors gear, penetrates the end piece, and is inserted into the cam shaft; and
   a scissors spring which has one side coupled to the end piece, and the other side coupled to the bolt,
   wherein when the end piece rotates, the scissors spring rotates the scissors gear relative to the cam gear through the bolt and allows the scissors gear to come into close contact with the cam gear;
   wherein the bolt further includes a bolt cap which is press-fitted with an inner diameter portion of the scissors gear, and a rod portion which is coupled to the bolt cap.

2. The anti-backlash structure of claim 1, wherein the end piece further includes a press-fit groove which is formed in a circumferential surface of the end piece so that the cam gear is in contact with the scissors gear and press-fitted with the end piece.

3. The anti-backlash structure of claim 1 wherein an internal thread and an external thread are formed on an outer diameter portion of the rod portion and an inner diameter portion of the bolt cap, respectively.

4. The anti-backlash structure of claim 1, wherein an inner diameter of the end piece is greater than an outer diameter of the bolt, such that the bolt rotates inside the end piece.

5. The anti-backlash structure of claim 1, wherein the end piece further includes an insertion groove which is formed at a lateral side of the scissors spring so as to accommodate the scissors spring.

6. The anti-backlash structure of claim 5, wherein the scissors spring further includes a straight portion which is inserted into the insertion groove such that the scissors spring and the end piece are coupled to each other.

7. The anti-backlash structure of claim 1, wherein the scissors spring further includes a through portion through which the bolt vertically penetrates such that the scissors spring and the bolt are coupled to each other.

* * * * *